US008493874B2

(12) United States Patent
Chen et al.

(10) Patent No.: US 8,493,874 B2
(45) Date of Patent: Jul. 23, 2013

(54) METHOD AND APPARATUS FOR PROVIDING CHANNEL QUALITY FEEDBACK IN AN ORTHOGONAL FREQUENCY DIVISION MULTIPLEXING COMMUNICATION SYSTEM

(75) Inventors: Jiangnan Jason Chen, Hawthorn Woods, IL (US); Fan Wang, Chicago, IL (US)

(73) Assignee: Motorola Mobility LLC, Libertyville, IL (US)

( * ) Notice: Subject to any disclaimer, the term of this patent is extended or adjusted under 35 U.S.C. 154(b) by 400 days.

(21) Appl. No.: 12/427,187

(22) Filed: Apr. 21, 2009

(65) Prior Publication Data
US 2009/0274204 A1 Nov. 5, 2009

Related U.S. Application Data

(60) Provisional application No. 61/050,284, filed on May 5, 2008.

(51) Int. Cl.
| | | |
|---|---|---|
| H04J 1/16 | (2006.01) | |
| H04J 3/14 | (2006.01) | |
| H04J 1/00 | (2006.01) | |
| H04L 12/26 | (2006.01) | |
| H04L 12/28 | (2006.01) | |
| H04W 4/00 | (2009.01) | |

(52) U.S. Cl.
USPC ............ 370/252; 370/254; 370/330; 370/480

(58) Field of Classification Search
None
See application file for complete search history.

(56) References Cited

U.S. PATENT DOCUMENTS

| | | | |
|---|---|---|---|
| 6,658,045 B1 | 12/2003 | Jin | |
| 7,289,574 B2 | 10/2007 | Parolari | |
| 2002/0056066 A1* | 5/2002 | Gesbert et al. | 714/759 |
| 2005/0068884 A1 | 3/2005 | Yoon et al. | |
| 2006/0008020 A1 | 1/2006 | Blankenship et al. | |
| 2006/0034244 A1 | 2/2006 | Huang et al. | |
| 2006/0198460 A1 | 9/2006 | Airy et al. | |
| 2006/0233272 A1* | 10/2006 | Raghavan et al. | 375/260 |
| 2007/0104149 A1* | 5/2007 | Khan et al. | 370/334 |
| 2008/0132173 A1* | 6/2008 | Sung et al. | 455/67.13 |
| 2009/0010319 A1* | 1/2009 | Sun et al. | 375/224 |

OTHER PUBLICATIONS

Park, Boo Sik: "The International Search Report and The Written Opinion of the International Searching Authority, or the Declaration", Korean Intellectual Property Office, Daejeon, Republic of Korea, Completed: Dec. 15, 2009, Mailed: Dec. 17, 2009.

(Continued)

Primary Examiner — Chirag Shah
Assistant Examiner — Ashley Shivers

(57) ABSTRACT

In an OFDM communication system, a mobile station provides a radio access network (RAN) a channel quality metric second order statistic, in one embodiment a signal to noise plus interference power ratio (SINR) second order statistic and in particular an SINR standard deviation and/or variance, along with a mean channel quality metric, that is, a mean SINR. By providing both a mean channel quality metric and a channel quality metric second order statistic, the communication system permits the RAN to create a more accurate fading profile of an associated air interface, and in particular a downlink of the air interface, thereby facilitating an improved scheduling decision over the prior art and assuring that a packet has a higher probability to go through a downlink channel without too many retransmissions.

8 Claims, 6 Drawing Sheets

OTHER PUBLICATIONS

WiMAX Forum Mobile System Profile Release 1.0 Approved Specification (Revision 1.7.0: Sep. 18, 2008), all pages.

Baum, Kevin et al: "Improved method for using EESM for CINR measurements", IEEE 802.16 Broadband Wireless Access Working Group <http://ieee802.or/16>, IEEE C802.16e-05/174r1, Mar. 14, 2005, all pages.

Abdi, A. and Kaveh, M.: "Performance comparison of three different estimators for the Nakagami m parameter using Monte Carlo Simulation", Communications Letters, IEEE, Apr. 2000, vol. 4, Issue 4, ISSN: 1089-7798, pp. 119-121.

Young-Chai Ko and Alouini, M.-S: "Estimation of Nakagami fading channel parameters with application to optimized transmitter diversity systems", IEEE Transactions on Wireless Communications, vol. 2, No. 2, Mar. 2003, ICCC 2001, IEEE International Conference, Helsinki, Finland, ISBN: 0-7803-7097-1, pp. 250-259.

3GPP TSG-RAN-1 Meeting #35, "Effective SIR Computation for WCDMA System-Level Simulations", Nov. 17-21, 2003, Lisboa, Portugal R1-03-1299 Nortel Networks, all pages.

Q.T. Zhang: "A Note on the Estimation of Nagagami-Fading Parameter", IEEE Communications Letters, vol. 6, No. 6, Jun. 2002, pp. 237-238.

* cited by examiner

| CQI (dB) | Mod | Code Rate | Rep rate |
|---|---|---|---|
| -10 | QPSK | 1/2 | 6 |
| -9 | QPSK | 1/2 | 6 |
| -8 | QPSK | 1/2 | 6 |
| -7 | QPSK | 1/2 | 6 |
| -6 | QPSK | 1/2 | 6 |
| -5 | QPSK | 1/2 | 6 |
| -4 | QPSK | 1/2 | 6 |
| -3 | QPSK | 1/2 | 6 |
| -2 | QPSK | 1/2 | 6 |
| -1 | QPSK | 1/2 | 6 |
| 0 | QPSK | 1/2 | 6 |
| 1 | QPSK | 1/2 | 4 |
| 2 | QPSK | 1/2 | 4 |
| 3 | QPSK | 1/2 | 4 |
| 4 | QPSK | 1/2 | 2 |
| 5 | QPSK | 1/2 | 2 |
| 6 | QPSK | 1/2 | 2 |
| 7 | QPSK | 1/2 | 2 |
| 8 | QPSK | 1/2 | 2 |
| 9 | QPSK | 1/2 | 1 |
| 10 | QPSK | 1/2 | 1 |
| 11 | QPSK | 1/2 | 1 |
| 12 | QPSK | 3/4 | 1 |
| 13 | QPSK | 3/4 | 1 |
| 14 | 16-QAM | 1/2 | 1 |
| 15 | 16-QAM | 1/2 | 1 |
| 16 | 16-QAM | 1/2 | 1 |
| 17 | 16-QAM | 1/2 | 1 |
| 18 | 16-QAM | 1/2 | 1 |
| 19 | 16-QAM | 3/4 | 1 |
| 20 | 16-QAM | 3/4 | 1 |
| 21 | 16-QAM | 3/4 | 1 |
| 22 | 16-QAM | 3/4 | 1 |
| 23 | 64-QAM | 2/3 | 1 |
| 24 | 64-QAM | 2/3 | 1 |
| 25 | 64-QAM | 2/3 | 1 |
| 26 | 64-QAM | 3/4 | 1 |
| 27 | 64-QAM | 3/4 | 1 |
| 28 | 64-QAM | 5/6 | 1 |
| 29 | 64-QAM | 5/6 | 1 |
| 30 | 64-QAM | 5/6 | 1 |
| 31 | 64-QAM | 5/6 | 1 |

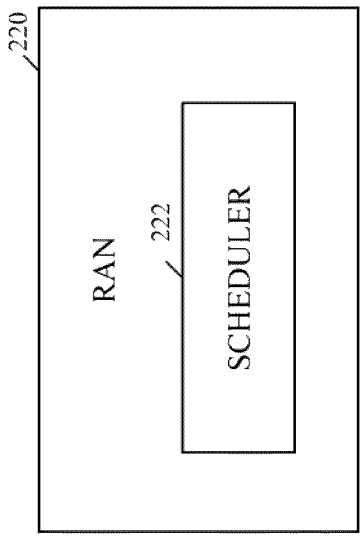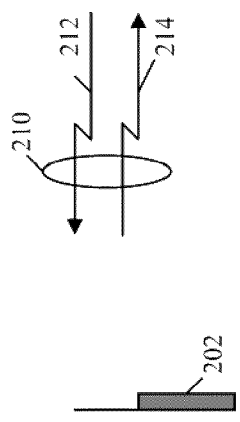
FIG. 2
FIG. 3
FIG. 4

| Mapping | CQI (dB) | Var(s(t)) range | Mod | Code Rate | Rep rate |
|---|---|---|---|---|---|
| 0 | CQI<=0dB | C1 | QPSK | 1/2 | 6 |
| 1 | | C2 | QPSK | 1/2 | 6 |
| 2 | | C3 | QPSK | 1/2 | 6 |
| 3 | | C4 | QPSK | 1/2 | 6 |
| 4 | 0<CQI<=3dB | C1 | QPSK | 1/2 | 4 |
| 5 | | C2 | QPSK | 1/2 | 4 |
| 6 | | C3 | QPSK | 1/2 | 4 |
| 7 | 3<CQI<=8dB | C1 | QPSK | 1/2 | 2 |
| 8 | | C2 | QPSK | 1/2 | 2 |
| 9 | | C3 | QPSK | 1/2 | 2 |
| 10 | 8<CQI<=11dB | C1 | QPSK | 1/2 | 1 |
| 11 | | C2 | QPSK | 1/2 | 1 |
| 12 | | C3 | QPSK | 1/2 | 1 |
| 13 | | C4 | QPSK | 1/2 | 1 |
| 14 | 11<CQI<=13dB | C1 | QPSK | 3/4 | 1 |
| 15 | | C2 | QPSK | 3/4 | 1 |
| 16 | 13<CQI<=18dB | C1 | 16-QAM | 1/2 | 1 |
| 17 | | C2 | 16-QAM | 1/2 | 1 |
| 18 | | C3 | 16-QAM | 1/2 | 1 |
| 19 | | C4 | 16-QAM | 1/2 | 1 |
| 20 | 18<CQI<=22dB | C1 | 16-QAM | 3/4 | 1 |
| 21 | | C2 | 16-QAM | 3/4 | 1 |
| 22 | | C3 | 16-QAM | 3/4 | 1 |
| 23 | 22<CQI<=25dB | C1 | 64-QAM | 2/3 | 1 |
| 24 | | C2 | 64-QAM | 2/3 | 1 |
| 25 | | C3 | 64-QAM | 2/3 | 1 |
| 26 | 25<CQI<=27dB | C1 | 64-QAM | 3/4 | 1 |
| 27 | | C2 | 64-QAM | 3/4 | 1 |
| 28 | 27<CQI<=31dB | C1 | 64-QAM | 5/6 | 1 |
| 29 | | C2 | 64-QAM | 5/6 | 1 |
| 30 | | C3 | 64-QAM | 5/6 | 1 |
| 31 | | C4 | 64-QAM | 5/6 | 1 |

| Mapping | CQI (dB) | Var(s(t)) range | Mod | Code Rate | Rep rate |
|---|---|---|---|---|---|
| 0 | CQI<=0dB | C1 | QPSK | 1/2 | 6 |
| 1 |  | C2 | QPSK | 1/2 | 6 |
| 2 | 0<CQI<=2dB | C1 | QPSK | 1/2 | 6 |
| 3 |  | C2 | QPSK | 1/2 | 6 |
| 4 | 2<CQI<=4dB | C1 | QPSK | 1/2 | 4 |
| 5 |  | C2 | QPSK | 1/2 | 4 |
| 6 | 4<CQI<=6dB | C1 | QPSK | 1/2 | 4 |
| 7 |  | C2 | QPSK | 1/2 | 2 |
| 8 | 6<CQI<=8dB | C1 | QPSK | 1/2 | 2 |
| 9 |  | C2 | QPSK | 1/2 | 2 |
| 10 | 8<CQI<=10dB | C1 | QPSK | 1/2 | 1 |
| 11 |  | C2 | QPSK | 1/2 | 1 |
| 12 | 10<CQI<=12dB | C1 | QPSK | 1/2 | 1 |
| 13 |  | C2 | QPSK | 1/2 | 1 |
| 14 | 12<CQI<=14dB | C1 | QPSK | 3/4 | 1 |
| 15 |  | C2 | QPSK | 3/4 | 1 |
| 16 | 14<CQI<=16dB | C1 | 16-QAM | 1/2 | 1 |
| 17 |  | C2 | 16-QAM | 1/2 | 1 |
| 18 | 16<CQI<=18dB | C1 | 16-QAM | 1/2 | 1 |
| 19 |  | C2 | 16-QAM | 1/2 | 1 |
| 20 | 18<CQI<=20dB | C1 | 16-QAM | 3/4 | 1 |
| 21 |  | C2 | 16-QAM | 3/4 | 1 |
| 22 | 20<CQI<=22dB | C1 | 16-QAM | 3/4 | 1 |
| 23 |  | C2 | 64-QAM | 2/3 | 1 |
| 24 | 22<CQI<=24dB | C1 | 64-QAM | 2/3 | 1 |
| 25 |  | C2 | 64-QAM | 2/3 | 1 |
| 26 | 24<CQI<=26dB | C1 | 64-QAM | 3/4 | 1 |
| 27 |  | C2 | 64-QAM | 3/4 | 1 |
| 28 | 26<CQI<=28dB | C1 | 64-QAM | 5/6 | 1 |
| 29 |  | C2 | 64-QAM | 5/6 | 1 |
| 30 | 28<CQI<=31dB | C1 | 64-QAM | 5/6 | 1 |
| 31 |  | C2 | 64-QAM | 5/6 | 1 |

METHOD AND APPARATUS FOR PROVIDING CHANNEL QUALITY FEEDBACK IN AN ORTHOGONAL FREQUENCY DIVISION MULTIPLEXING COMMUNICATION SYSTEM

CROSS-REFERENCE TO RELATED APPLICATION

This application claims priority from provisional application Ser. No. 61/050,284, entitled "METHOD AND APPARATUS FOR PROVIDING CHANNEL QUALITY FEEDBACK IN AN ORTHOGONAL FREQUENCY DIVISION MULTIPLEXING COMMUNICATION SYSTEM," filed May 5, 2008, which is commonly owned and incorporated herein by reference in its entirety.

FIELD OF THE INVENTION

The present invention relates generally to Orthogonal Frequency Division Multiplexing (OFDM) communication systems, and, in particular, to an exchange of channel quality information in an OFDM communication system.

BACKGROUND OF THE INVENTION

The IEEE (Institute of Electrical and Electronics Engineers) 802.16 standards propose using Orthogonal Frequency Division Multiple Access (OFDMA) for transmission of data over an air interface. OFDMA has also been proposed for use in 3GPP (Third Generation Partnership Project) Evolution communication systems. In an OFDMA communication system, a frequency bandwidth is split into multiple contiguous frequency sub-bands, each sub-band comprising multiple sub-carriers, that are transmitted simultaneously. A user may then be assigned one or more of the frequency sub-bands for an exchange of user information, thereby permitting multiple users to transmit simultaneously on the different sub-carriers. These sub-carriers are orthogonal to each other, and thus intra-cell interference is minimized.

In order to maximize bandwidth usage, for any given Transmission Time Interval (TTI) the sub-bands may be allocated to users based on measured channel conditions. Further, an appropriate modulation scheme and coding scheme may be determined for each sub-band and each TTI based on the measured channel conditions. The channel condition measurements are performed by a mobile station (MS). The MS measures channel conditions, such as a Signal power over the Interference plus Noise Ratio (SINR) for a common pilot channel or on a preamble, for each and every sub-band during a measuring period, such as a Transmission Time Interval (TTI) (also known as a sub-frame) or a radio frame transmission period, and then reports an average of the measured channel conditions across all of the sub-bands to a serving Node B in a Channel Quality Information (CQI) message. Based on the reported average, or mean, SINR, an OFDMA communication system selectively schedules the sub-bands over a scheduling period, typically one or more TTIs or radio frames, and further adaptively determines appropriate modulation and coding schemes for each sub-band during the scheduling period.

Typically, the CQI message comprises six bits borrowed from a system overhead message. For example, FIG. 1 is a table 100 depicting a mapping of modulation schemes and coding rates to mean SINR reported in a CQI message. The first column 101 of the table lists the mean SINR values that may be reported by a MS (wherein mean SINR of $\leq 0$ dB may be represented by a single value) and the second, third, and fourth columns 102, 103, and 104 of the table 100 list the modulation schemes, error encoding rates, and repetition rates mapped by a scheduler to the corresponding mean SINRs values reported by the MS. However, reporting a mean SINR across all sub-bands may not describe the channel properly, especially with frequency selective fading channels.

Therefore, a need exists for a method and apparatus that provides channel quality information sufficient to construct a fading profile of a frequency bandwidth with fading channels and that does not consuming the overhead resulting from the reporting of CQI for every sub-band of the frequency bandwidth.

BRIEF DESCRIPTION OF THE DRAWINGS

FIG. 1 is a table of Channel Quality Information (CQI) values that may be reported by a mobile station and the corresponding modulation schemes and coding rates that may be mapped to those values in accordance with the prior art.

FIG. 2 is a block diagram of a wireless communication system in accordance with an embodiment of the present invention.

FIG. 3 is a block diagram of a mobile station of the communication system of FIG. 2 in accordance with an embodiment of the present invention.

FIG. 4 is a block diagram of a scheduler of the communication system of FIG. 2 in accordance with an embodiment of the present invention.

FIG. 6 is a table of Channel Quality Information (CQI) values that may be reported by a mobile station and the corresponding modulation schemes and coding rates that may be mapped to those values in accordance with an embodiment of the present invention.

FIG. 7 is a table of CQI values that may be reported by a mobile station and the corresponding modulation schemes and coding rates that may be mapped to those values in accordance with another embodiment of the present invention.

Figure 5:
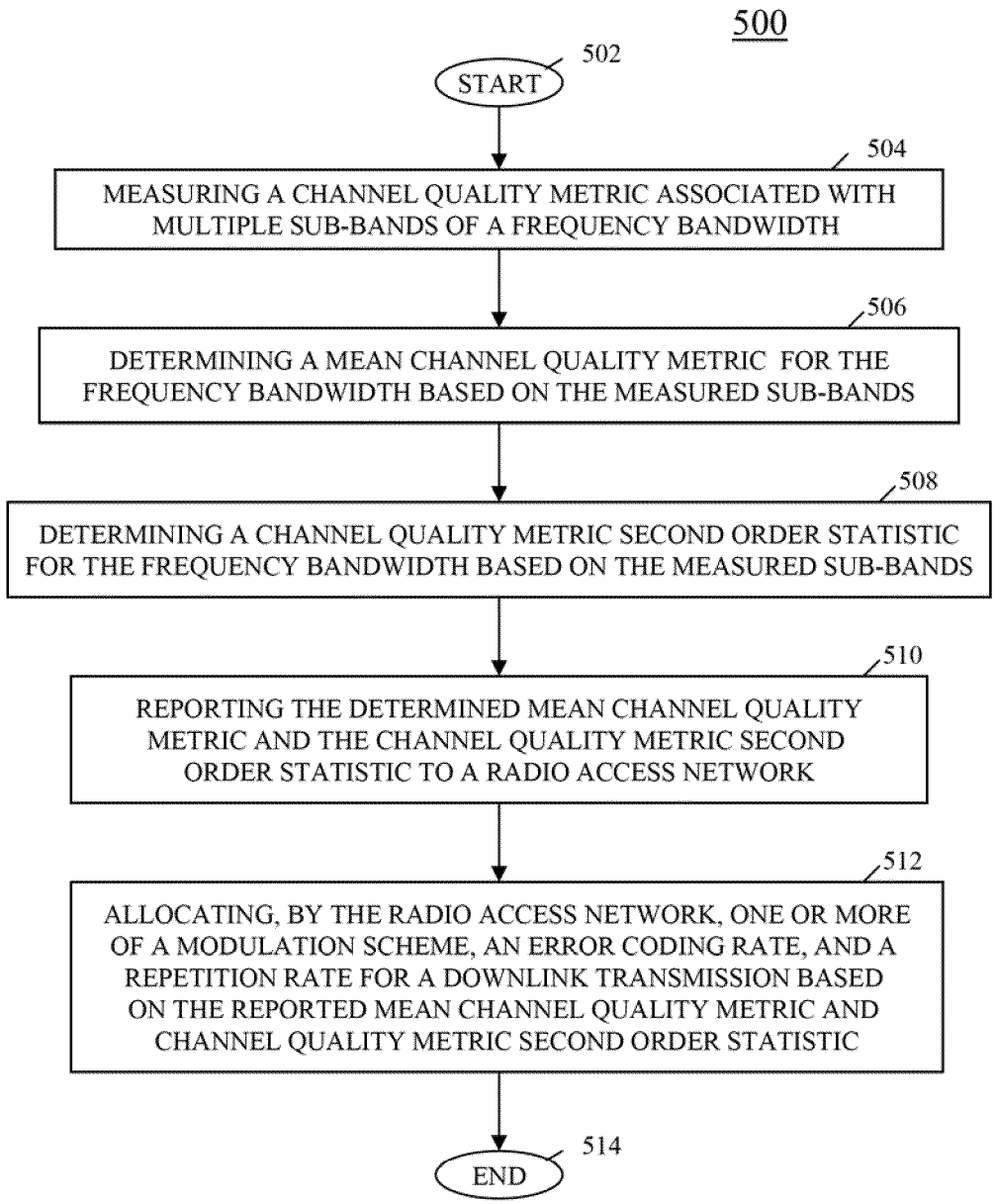
FIG. 5 is a logic flow diagram of a method for reporting channel quality information and scheduling mobile station performed by the communication system of FIG. 2 in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and an apparatus that provides channel quality information sufficient to construct a fading profile of a frequency bandwidth with fading channels and that does not consuming the overhead resulting from the reporting of CQI for every sub-band of the frequency bandwidth, an Orthogonal Frequency Division Multiplexing (OFDM) communication system is provided wherein a mobile station (MS) provides a radio access network (RAN) a channel quality metric second order statistic, in one embodiment a signal to noise plus interference power ratio (SINR) second order statistic, and in particular an SINR standard deviation and/or variance, along with a mean channel quality metric, that is, a mean SINR. By providing both a mean channel quality metric and a channel quality metric second order statistic, the communication system permits the RAN to create a more accurate fading profile of an associated air interface, and in particular a downlink of the air interface, thereby facilitating an improved scheduling decision over the prior art and assuring that a packet has a higher probability to go through a downlink channel without too many retransmissions.

Generally, an embodiment of the present invention encompasses a method for providing channel quality feedback in an OFDM communication system wherein a frequency bandwidth is divided into multiple sub-bands. The method includes measuring a channel quality metric associated with each sub-band of multiple sub-bands of the frequency bandwidth, determining a mean channel quality metric based on the measured channel quality metrics, determining a channel quality second order statistic based on the measured channel quality metrics, and reporting the mean channel quality metric and the channel quality metric second order statistic to a radio access network (RAN).

Another embodiment of the present invention encompasses a mobile station (MS) that is configured to report a channel quality in an OFDM communication system wherein a frequency bandwidth is divided into multiple sub-bands, wherein the MS comprises a processor that is configured to measure a channel quality metric associated with each sub-band of multiple sub-bands of the frequency bandwidth, determine a mean channel quality metric based on the measured quality metrics, determine a channel quality metric second order statistic based on the measured channel quality metrics, and report the mean channel quality metric and the channel quality metric second order statistic to a radio access network.

Yet another embodiment of the present invention encompasses a scheduler operable in an OFDM communication system wherein a frequency bandwidth is divided into multiple sub-bands, wherein the scheduler is configured to receive a mean channel quality metric and a channel quality metric second order statistic from an MS and to allocate, to the MS, one or more of a modulation scheme, an error coding rate, and a repetition rate based on the reported mean channel quality metric and channel quality metric second order statistic.

The present invention may be more fully described with reference to FIGS. 2-9. FIG. 2 is a block diagram of a wireless communication system 200 in accordance with an embodiment of the present invention. Communication system 200 includes at least one mobile station (MS) 202, such as but not limited to a cellular telephone, a radio telephone, a personal digital assistant (PDA), laptop computer, or personal computer with radio frequency (RF) capabilities, or a wireless modem that provides RF access to digital terminal equipment (DTE) such as a laptop computer. Communication system 200 further includes a Radio Access Network (RAN) 220 that provides communication services to users equipment, such as MS 202, residing in a coverage area of the RAN via an air interface 210.

RAN 220 includes one or more transceivers (not shown), such as a Node B or a Base Transceiver Station (BTS), in wireless communication with each MS, such as MS 202, service by the RAN and further includes an access network controller (not shown), such as a Radio Network Controller (RNC) or a Base Station Controller (BSC), coupled to the one or more transceivers. RAN 220 further includes a packet scheduler 222 that performs the scheduling functions described herein as being performed by the RAN. In various embodiments of the invention, scheduler 222 may be implemented in the transceiver or the controller of RAN 220, or scheduler 222 may be a separate module coupled to each of the transceiver and the controller. Air interface 210 comprises a downlink 212 and an uplink 214. Each of downlink 212 and uplink 214 comprises multiple physical communication channels, including at least one signaling channel and at least one traffic channel.

FIG. 3 is a block diagram of MS 202 in accordance with an embodiment of the present invention. MS 202 includes a processor 302, such as one or more microprocessors, microcontrollers, digital signal processors (DSPs), combinations thereof or such other devices known to those having ordinary skill in the art. The particular operations/functions of processor 302, and thus of MS 202, is determined by an execution of software instructions and routines that are stored in a respective at least one memory device 304 associated with the processor, such as random access memory (RAM), dynamic random access memory (DRAM), and/or read only memory (ROM) or equivalents thereof, that store data and programs that may be executed by the corresponding processor.

FIG. 4 is a block diagram of scheduler 222 in accordance with an embodiment of the present invention. Scheduler 222 includes a processor 402, such as one or more microprocessors, microcontrollers, digital signal processors (DSPs), combinations thereof or such other devices known to those having ordinary skill in the art. The particular operations/functions of processor 402, and respectively thus of scheduler 222, are determined by an execution of software instructions and routines that are stored in an at least one memory device 404 associated with the processor, such as random access memory (RAM), dynamic random access memory (DRAM), and/or read only memory (ROM) or equivalents thereof, that store data and programs that may be executed by the corresponding processor. In various embodiments of the present invention, when scheduler 222 is implemented in the transceiver or the controller of RAN 220, processor 402 may be the processor of the implementing network element and at least one memory device 404 may be a corresponding memory device of the implementing network element.

The embodiments of the present invention preferably are implemented within MS 202 and scheduler 222, and more particularly with or in software programs and instructions stored in the respective at least one memory device 304, 404 and executed by respective processors 302, 402 of the MS and scheduler. However, one of ordinary skill in the art realizes that the embodiments of the present invention alternatively may be implemented in hardware, for example, integrated circuits (ICs), application specific integrated circuits (ASICs), and the like, such as ASICs implemented in one or more of MS 202 and scheduler 222. Based on the present disclosure, one skilled in the art will be readily capable of producing and implementing such software and/or hardware without undo experimentation.

Communication system 200 comprises a wideband packet data communication system that employs an Orthogonal Frequency Division Multiplexing (OFDM) modulation scheme for transmitting data over air interface 210. Preferably, communication system 200 is an Orthogonal Frequency Division Multiple Access (OFDMA) communication system, wherein a frequency bandwidth employed by the communication system is split into multiple frequency sub-bands, or Resource Blocks (RBs), during a given time period. Each sub-band comprises multiple orthogonal frequency sub-carriers over a given number of OFDM symbols, that are the physical layer channels over which traffic and signaling channels are transmitted in a TDM or TDM/FDM fashion. The channel bandwidth also may be sub-divided into one or more sub-band groups, or Resource Block Groups (RBGs), wherein each sub-band group comprises one or more sub-bands that may or may not be contiguous, and the sub-band groups may or may not be of equal size. A communication session may be assigned one or more sub-bands or sub-band groups for an exchange of bearer information, thereby permitting multiple users to transmit simultaneously on the different sub-bands such that each user's transmission is orthogonal to the other users' transmissions.

In addition, communication system 200 preferably comprises a Worldwide Interoperability for Microwave Access (WiMAX) communication system that operates in accordance with the IEEE (Institute of Electrical and Electronics Engineers) 802.16 standards, which standards specify wireless telecommunications system operating protocols, including radio system parameters and call processing procedures. However, those who are of ordinary skill in the art realize that communication system 200 may operate in accordance with any wireless telecommunication system employing an Orthogonal Frequency Division Multiplexing (OFDM) modulation scheme, such as a 3GPP (Third Generation Partnership Project) E-UTRA (Evolutionary UMTS Terrestrial Radio Access) communication system, a 3GPP2 (Third Generation Partnership Project 2) Evolution communication system, for example, an Ultra Mobile Broadband (UMB) communication system, a Wireless Local Area Network (WLAN) communication system as described by the IEEE 802.xx standards, for example, the 802.11a/HiperLAN2, 802.11g, or 802.20 standards, or any of multiple proposed ultrawideband (UWB) communication systems.

In order for RAN 220, and more particularly scheduler 222, to selectively schedule each MS, such as MS 202, served by the RAN for use of one or more sub-bands of a frequency bandwidth employed by communication system 200, RAN 220 provides each served MS with scheduling information for a scheduling period. The scheduling information may include, for example, a reference start time, preferably in units of radio frames such as a starting Cell System Frame Number (SFN) index or a starting Connection Frame Number (CFN) index, a scheduling duration, that is, a duration of a time period during which the provided scheduling information is applicable, for example, in units of radio frames or Transmission Time Intervals (TTIs), and an allocated sub-band. In turn, the scheduling information is based on channel quality information provided to the RAN by the served MSs. In order to permit RAN 220 to construct a more accurate fading profile of the channels in air interface 210, and more particularly downlink 212, each MS served by the RAN reports a mean channel quality metric for the frequency bandwidth and secondary statistical channel quality information comprising one or more of a standard deviation associated with a measured channel quality metric and a variance associated with the measured channel quality. By reporting a standard deviation and/or a variance of the channel quality, the RAN is able to better determine a rate of change of channel conditions for downlink 212, construct a more accurate fading profile, and implement improved scheduling decisions for served MSs than was possible in the prior art.

Referring now to FIG. 5, a logic flow diagram 500 is provided that illustrates a method for reporting channel quality information by a MS, such as MS 202, and scheduling MSs by a serving RAN, that is, RAN 220 and in particular scheduler 222, in accordance with an embodiment of the present invention. Logic flow diagram 500 begins (502) when MS 202 measures (504) a channel quality metric, preferably measuring Channel Quality Information (CQI) as is known in the art, associated with each sub-band of multiple sub-bands of a frequency bandwidth employed by communication system 200 during a measuring period, such as a Transmission Time Interval (TTI) (also known as a sub-frame) or a radio frame transmission period. For example, for each measured sub-band, MS 202 may measure a received signal power, a signal to noise ratio (SNR), a carrier to interference ratio (CIR), a signal to noise plus interference power ratio (SINR), or a carrier power over the interference plus noise ratio (CINR) associated with a signal transmitted over a channel utilizing the sub-band and received by the MS, or may measure a bit error rate or a frame error rate associated with such a signal. One of ordinary skill in the art realizes that many channel quality metrics may be measured in determining channel quality and that any such parameter may be used herein without departing from the spirit and scope of the present invention.

Based on the measured channel quality metrics for the sub-bands, MS 202 determines (506) a mean channel quality metric, that is, a first moment of the channel quality metric, preferably a mean SINR, for the frequency bandwidth as is known in the art. Furthermore, based on the channel quality measurements, MS 202 determines (508) one or more second order statistics for the channel quality metric, and more particularly one or more of a standard deviation of the channel quality, that is, a second moment of the channel quality, and a variance of the channel quality for the frequency bandwidth.

For example, suppose $\overline{s(t)}$ is defined as a mean signal quality metric, such as either an average received pilot power, an average pilot signal to noise plus interference power ratio (SINR), or an average carrier signal to noise plus interference power ratio (CINR), measured and determined by MS 202, depending on different standards and implementations. The signal quality can be measured based on, for example, received preambles samples or received pilot symbols. '$\overline{s(t)}$' then, in general, reflects the mean of the measured signal quality and 's(t)' corresponds to an instantaneous value of measured signal quality. In communication system 200, MS 202 further determines one or more second order statistics associated with the measured channel quality metric, such as a variance of s(t), that is, 'var(s(t)).' The equation for determining a variance of (t) then is given by $$\text{var}(s(t)) = \frac{1}{N} \sum_N (s(t) - \overline{s(t)})^2 \qquad (1)$$

where N is the number of samples taken by the MS during the measurement period. In implementation, the variance can be computed using first and second order moments. Specifically, the first and second moments of the channel quality metric may be computed according to $$\mu = \frac{1}{N} \sum_N s(t) \qquad (2)$$

and $$\chi = \frac{1}{N} \sum_N s(t)^2. \qquad (3)$$

The variance is then $$\text{var}(s(t)) = \chi - \mu^2 \quad (4)$$

Another proper statistic is defined as Averaged Fading Duration (AFD), where $$AFD = \frac{\sum_{i=1}^{N_t} t_i}{N_t}, \quad (5)$$

where $N_t$ is the total number of counts that s(t)<Threshold within the measurement time period and where each $t_i$ is the time period of the measured signal metric s(t)<Threshold, which is defined as $$t_i = t_{start}(i) - t_{end}(i) \quad (6),$$

where $t_{start}$ and $t_{end}$ are the beginning time and the end time when the test condition s(t)<Threshold is satisfied.

The threshold in the test condition can be defined as $$\text{Threshold} = \overline{s(t)} + \Delta \quad (7)$$

where $\Delta$ is a constant that can make the threshold be either above or below the mean $\overline{s(t)}$, or can be set to zero. In various embodiments of the invention, either var (s(t)) or AFD may be used as a second order statistic in the design. For purposes of illustrating the principles of the present invention and not intending to limit the invention in any way, the variance, that is, var(s(t)), is used as the second order statistic that is determined by a MS and is reported to RAN 220 herein. However, one of ordinary skill in the art realizes that AFD or standard deviation may instead, or in addition, be used herein without departing from the spirit and scope of the present invention.

In response to determining a mean and a second order statistic, such as a variance and/or a standard deviation, of a channel quality metric associated with downlink 212, MS 202 reports (510) to RAN 220, and in particular to scheduler 222, the determined channel quality metric mean and second order statistic. Preferably, MS 202 assembles, and conveys to the RAN during the reporting period, and the RAN receives from the MS, one or more channel quality messages that inform of the determined mean channel quality metric, preferably a mean SINR, and the channel quality metric second order statistic, again such as a variance and/or a standard deviation, preferably an SINR variance and/or standard deviation.

Based on the reported mean channel quality metric and channel quality metric second order statistic, RAN 220, and in particular scheduler 222, allocates (512) one or more of a modulation scheme, an error coding rate, and a repetition rate to the reporting MS for a downlink transmission to the MS. For example, based on the determined channel quality metric second order statistic, the scheduler may be more or less aggressive in allocating a modulation and coding scheme (MCS). For example, for a large standard deviation or variance, the scheduler may be less aggressive in allocating a modulation and coding scheme, allocating lower coding rates or lower modulation schemes (e.g., QPSK or 16-QAM), whereas for a small standard deviation or variance, the scheduler may be more aggressive in allocating a modulation and coding scheme, allocating higher coding rates or higher modulation schemes (e.g., 16-QAM as compared to QPSK, or 64-QAM as compared to 16-QAM). Whether a standard deviation or variance is large or small may be determined by comparison of the standard deviation or variance to one or more thresholds, that is, by determining which range, of one or more standard deviation or variance ranges, the determined standard deviation or variance falls into, and which thresholds may be maintained in the at least one memory devices 304, 404 of the MS and scheduler. Logic flow diagram 500 then ends (514).

In one embodiment of the present invention, MS 202 may report the mean SINR and SINR variance and/or standard deviation in a same CQI message. For example, instead of using all six bits of a CQI message of the prior art to report a mean SINR, four of the bits may be allocated to reporting a mean SINR and the remaining two bits may be used to report an SINR variance. Referring now to FIG. 6, a table 600 is provided that depicts an exemplary mapping, by a MS such as MS 202, of a mean SINR and an SINR variance determined by the MS to a CQI value that is reported by the MS, and a further mapping, by a scheduler such as scheduler 222, of the reported mean SINR and an SINR variance to modulation schemes, coding rates, and repetition rates in accordance with an embodiment of present invention. A first column 601 of table 600 is a listing of CQI values reported by the MS in a CQI message. As a CQI message is assumed here to comprise six bits, there are 32 values (0-31) depicted in column 601. A second column 602 of table 600 lists mean SINRs measured by the MS and a third column 603 of table 600 lists SINR variances determined by the MS. Instead of reporting specific means and specific variances, the possible means are divided into ten mean ranges, for example, 0<CQI≦3 dB, 3<CQI≦8 dB, 8<CQI≦11 dB, and so on, and the variances are divided into four ranges, that is, C1, C2, C3, and C4, wherein each variance range C1-C4 covers a predetermined range of variances that are determined by a designer of the communication system. The means included in each range of means, and the variances included in each range of variances, are up to the designer of the communication system and are not critical to the implementation of the current invention. The MS then reports to the RAN the ranges comprising the determined mean and variance. By merely reporting ranges, rather than the specifically determined mean and variance, only 6 bits are needed to report the determined mean and variance.

That is, as can be seen in table 600, each CQI value listed in column 601 is associated with a corresponding mean SINR range of column 602 and a corresponding SINR variance range of column 603. For example, if a MS determines a mean received signal power of 12 dB and a variance that falls in a variance range C3, the MS would select, and report, a CQI value of '12,' or '00110.' The mapping of SINR means and variances to reported CQI values, that is, the mapping of column 602 and 603 to column 601, is maintained in the at least one memory device 304 of the MS, that is, MS 202. In various embodiments of the present invention, the mapping may be maintained in a table format, such as depicted in FIG. 6, or in an algorithmic format.

Columns 604-606 of table 600 then depict the mapping of a received CQI value to a modulation and coding scheme and a repetition rate that is performed by a scheduler such as scheduler 222. That is, a fourth column 604 of table 600 comprises modulation schemes associated with each CQI value included in column 601, a fifth column 605 of table 600 comprises coding rates associated with each CQI value included in column 601, and a sixth column 606 of table 600 comprises a bit or symbol repetition rate associated with each CQI value included in column 601. Again, supposing a MS reports a CQI value of 12, RAN 220, and in particular scheduler 222, allocates to the MS, for a downlink transmission, a Quadrature Phase Shift Keying (QPSK) modulation scheme, an error encoding rate, such as a convolutional coding rate, of ½, and a bit or symbol repetition rate of 1. The mapping of received CQI values to modulation schemes, coding rates, and repetition rates, that is, the mapping of column 601 to columns 604-606, is maintained in the at least one memory device 404 associated with scheduler 222. Similar to MS 202, scheduler 222 may maintain the mapping in a table format, such as depicted in FIG. 6, or in an algorithmic format.

Referring now to FIG. 7, a table 700 is provided that depicts an exemplary mapping, by a MS such as MS 202, of a mean SINR and an SINR variance determined by the MS to a CQI value that is reported by the MS, and a further mapping, by a scheduler such as scheduler 222, of the reported CQI value, corresponding to the determined SINR mean and variance, to modulation schemes, coding rates, and repetition rates in accordance with another embodiment of present invention, where the mapping is uniformly distributed. Similar to FIG. 6, a first column 701 of table 700 is a listing of CQI values reported by a MS, such as MS 202, to a serving RAN, such as RAN 220 and in particular scheduler 222, in a CQI message. A second column 702 of table 700 is a listing of SINR mean ranges of MS associated with the CQI values in column 701, and a third column 703 of table 700 is a listing of SINR variance ranges associated with the CQI values in column 701. Again, a CQI value is selected for reporting by MS 202 based on the SINR mean and variance determined by the MS.

As depicted in table 700, the possible means are divided into 16 mean ranges of uniform size, that is, $0 < CQI \leq 2$ dB, $2 < CQI \leq 4$ dB, $4 \leq CQI \leq 6$ dB, and so on. The variances are divided into two ranges, that is, C1 and C2, where each variance range C1, C2 covers a predetermined range of variances that are determined by a designer of the communication system. Similar to the scenario described above with respect to FIG. 6, the MS then reports the ranges that correspond to the SINR mean and variance determined by the MS based on measured channel conditions.

Columns 704-706 of table 700 then depict the mapping of a received CQI value to a modulation and coding scheme and a bit or symbol repetition rate that is performed by a scheduler such as scheduler 222. That is, a fourth column 704 of table 700 comprises modulation schemes associated with the CQI values included in column 701, a fifth column 705 of table 700 comprises coding rates associated with the CQI values included in column 701, and a sixth column 706 of table 700 comprises a bit or symbol repetition scheme associated with the CQI values included in column 701. The mappings of received CQI values to modulation schemes, coding rates, and repetition rates, that is, the mapping of column 701 to columns 704-706, are maintained in the at least one memory device 404 associated with scheduler 222. Again, supposing a MS reports a CQI value of 12, which corresponds to a measured mean SINR in the range of 10 to 12 dB and a variance in range C2, then RAN 220, and in particular scheduler 222, allocates to the MS, for a downlink transmission, a Quadrature Phase Shift Keying (QPSK) modulation scheme, an error encoding rate, such as a convolutional coding rate, of ½, and a bit or symbol repetition rate of 1.

One may note that for the two reporting schemes depicted in FIGS. 6 and 7, the reported parameter 'var(s(t))' is embedded into a prior art CQI table such as table 100. In this way, the reported CQI values may comprise the same number of bits as the prior art CQI values, and the reporting of an SINR variance is backward compatible with the prior art CQI message, requiring no additional bits to report both the SINR mean and variance, as opposed to the number of bits required in the prior art to report merely the SINR mean. Thus, in the exemplary embodiments depicted in FIGS. 6 and 7, the CQI reporting region in a frame is pre-defined and fits within existing formats specified for CQI reporting, such as in WiMAX.

Figure 8:
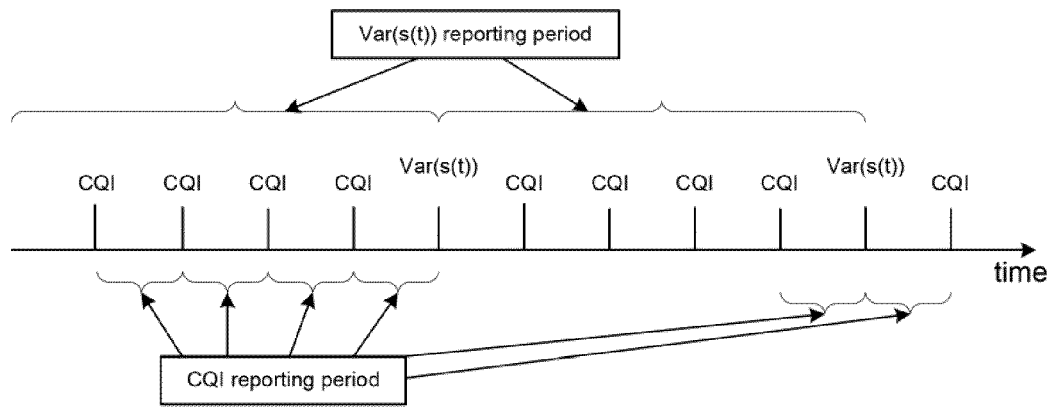
FIG. 8 is a timing diagram that depicts a periodic reporting of a mean SINR value in accordance with another embodiment of the present invention.

In other embodiments of the present invention, the SINR second order statistic may be intermittently conveyed in a CQI message instead of a mean SINR value. For example, FIG. 8 is a timing diagram that depicts a periodic reporting of a mean SINR value in accordance with an embodiment of the present invention. In current WiMAX systems, the CQI messages are sent out periodically, with a predefined first reporting time interval 802. In order to send the second order statistic of channel quality, such as standard deviation information or the variance var(s(t)) information, a MS, such as MS 202, can overwrite the mean SINR value of the CQI message with an SINR second order statistic value from time to time, as shown in FIG. 8, by predefining a second reporting time interval 804 for a conveyance of CQI standard deviation/variance messages, which first and second reporting time intervals 802, 804 are maintained in the at least one memory devices of MS 202 and RAN 220, and in particular the at least one memory device associated with scheduler 222. Since the standard deviation/variance changes at a much slower rate than the mean SINR value, the second reporting time interval 804 (for reporting of a CQI standard deviation/variance value) may be larger than the first reporting time interval 802 (for reporting of a mean SINR value). Again, in order to promote backwards compatibility as described with respect to FIGS. 7 and 8, the CQI message region in a frame is predefined and fits within existing formats specified for CQI reporting, such as in WiMAX.

Figure 9:
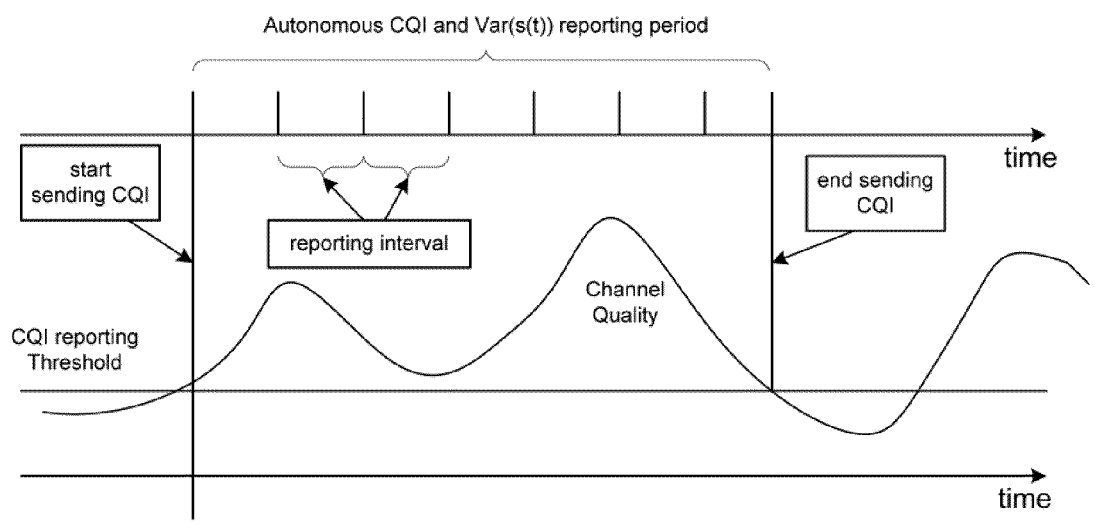
FIG. 9 is a timing diagram that depicts a periodic reporting of a mean SINR value in accordance with another embodiment of the present invention.

FIG. 9 is a timing diagram 900 depicting yet another embodiment for a reporting of a mean SINR value along with an SINR second order statistic. In this embodiment, a MS such as MS 202 autonomously sends the SINR mean and standard deviation or variance, that is, var(s(t)), as feedback at variable rates, based on channel conditions. For example, the MS may only send CQI messages when the MS determines that the mean of the measured SINR exceeds a channel quality reporting threshold 902. In other words, the MS may compare the mean of the measured SINR to threshold 902. When, and for so long as, the mean of the measured SINR exceeds threshold 902, that is, during time period 904, the MS periodically reports, that is, reports at a predetermined reporting interval 906, both a mean SINR and an SINR variance, for example, by reporting a CQI value as depicted in the tables of FIGS. 6 and 7. When the mean of the measured SINR is less than threshold 902, then the MS does not perform CQI reporting. The channel quality reporting threshold 902 and interval 906 are maintained in the at least one memory devices of MS 202 and RAN 220, and in particular in the at least one memory device associated with scheduler 222.

By MS 202 providing to RAN 220 a channel quality metric second order statistic, preferably an SINR second order statistic and in particular an SINR standard deviation and/or variance, along with a mean channel quality metric, that is, a mean SINR, communication system 200 permits RAN 220, and in particular scheduler 222, to create a more accurate fading profile of air interface 210, and in particular downlink 212, thereby facilitating an improved scheduling decision over the prior art and assuring that a packet has a higher probability to go through a downlink channel without too many retransmissions.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing channel quality feedback in an Orthogonal Frequency Division Multiplexing communication system wherein a frequency bandwidth is divided into a plurality of sub-bands, the method comprising:
   measuring, by a mobile station, a channel quality metric associated with each sub-band of a plurality of sub-bands of the frequency bandwidth;
   determining a mean channel quality metric value based on the measured channel quality metrics;
   determining a channel quality metric second order statistic value based on the measured channel quality metrics, wherein the channel quality metric second order statistic value comprises one or more of a channel quality metric standard deviation and a channel quality metric variance;
   maintaining a mapping of a plurality of channel quality values, wherein each channel quality value of the plurality of channel quality values is mapped to a range of mean channel quality metric values and a range of channel quality metric second order statistic values;
   determining a channel quality value of the plurality of channel quality values based on the determined mean channel quality metric value, the determined channel quality metric second order statistic value, and the mapping of the plurality of channel quality values; and
   reporting the determined channel quality value to a radio access network.

2. The method of claim 1, wherein the method further comprises allocating, to the mobile station, one or more of a modulation scheme, an error coding rate, and a repetition rate based on the reported channel quality value.

3. The method of claim 1, wherein reporting comprises:
   comparing the mean channel quality metric value to a channel quality reporting threshold; and
   when the mean channel quality metric value exceeds the channel quality reporting threshold, reporting the channel quality value to a radio access network.

4. The method of claim 1, wherein the mapping comprises a table.

5. The method of claim 1, wherein the mapping comprises an algorithm.

6. A mobile station that is configured to report a channel quality in an Orthogonal Frequency Division Multiplexing communication system wherein a frequency bandwidth is divided into a plurality of sub-bands, wherein the mobile station comprises:
   an at least one memory device that maintains a mapping of a plurality of channel quality values, wherein each channel quality value of the plurality of channel quality values is mapped to a range of mean channel quality metric values and a range of channel quality metric second order statistic values; and
   a processor that is configured to measure a channel quality metric associated with each sub-band of a plurality of sub-bands of the frequency bandwidth, determine a mean channel quality metric value based on the measured channel quality metrics, determine a channel quality metric second order statistic value based on the measured channel quality metrics, determine a channel quality value of the plurality of channel quality values based on the determined mean channel quality value, the determined channel quality metric second order statistic value, and the mapping of the plurality of channel quality values, wherein the channel quality metric second order statistic value comprises one or more of a channel quality metric standard deviation and a channel quality metric variance, and report the determined channel quality value to a radio access network.

7. The mobile station of claim 6, wherein the mapping comprises a table.

8. The mobile station of claim 6, wherein the mapping comprises an algorithm.

* * * * *